(12) United States Patent
Jendraszczak et al.

(10) Patent No.: US 10,207,683 B2
(45) Date of Patent: Feb. 19, 2019

(54) WIPER SYSTEM FOR A VEHICLE WITH A SCREEN WASH SYSTEM

(71) Applicant: Valeo Systèmes d'Essuyage, Le Mesnil Saint Denis (FR)

(72) Inventors: Jean Jendraszczak, Châtellerault (FR); Pierre Blanchet, Scorbé-Clairvaux (FR); Joël Princet, Châtellerault (FR); Eric Gallaud, Poitiers (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 472 days.

(21) Appl. No.: 14/796,282

(22) Filed: Jul. 10, 2015

(65) Prior Publication Data

US 2016/0016557 A1 Jan. 21, 2016

(30) Foreign Application Priority Data

Jul. 17, 2014 (FR) ...................................... 14 56857

(51) Int. Cl.
*B60S 1/48* (2006.01)
*B60S 1/50* (2006.01)
(Continued)

(52) U.S. Cl.
CPC ................. *B60S 1/483* (2013.01); *B60S 1/08* (2013.01); *B60S 1/482* (2013.01); *B60S 1/50* (2013.01); *H02K 11/21* (2016.01)

(58) Field of Classification Search
CPC ............. B60S 1/08; B60S 1/482; B60S 1/483
(Continued)

(56) References Cited

U.S. PATENT DOCUMENTS 3,919,613 A * 11/1975 Steinmann .............. B60S 1/606
15/250.002
4,275,477 A 6/1981 Kato
(Continued)

FOREIGN PATENT DOCUMENTS

FR 1592752 A 5/1970
FR 2766144 A1 1/1999
(Continued)

OTHER PUBLICATIONS

French Search Report issued in corresponding French Patent Application 1456857 dated Mar. 18, 2015 (8 pages).

*Primary Examiner* — Andrew A Horton
(74) *Attorney, Agent, or Firm* — Osha Liang LLP

(57) ABSTRACT

A drive motor for at least one wiper arm intended to wipe a glazed surface of a motor vehicle is disclosed. The motor includes a cam surface linked in concentric rotation with a rotary shaft of the drive motor, and static cam reading means able to cooperate with said cam according to the angular positions occupied by said cam to generate electrical control signals varying as a function of the angular position of the wiper arm on the glazed surface. The cam has a first circular conductive track, a second semi-circular conductive track concentric to the first conductive track and connected to same via a conductive bridge, in which the static reading means are formed by three sliding contacts able to make and break electrical contact with respectively the first and second conductive tracks and the conductive bridge depending on the angular positions occupied by said cam.

11 Claims, 6 Drawing Sheets

Figure 1:
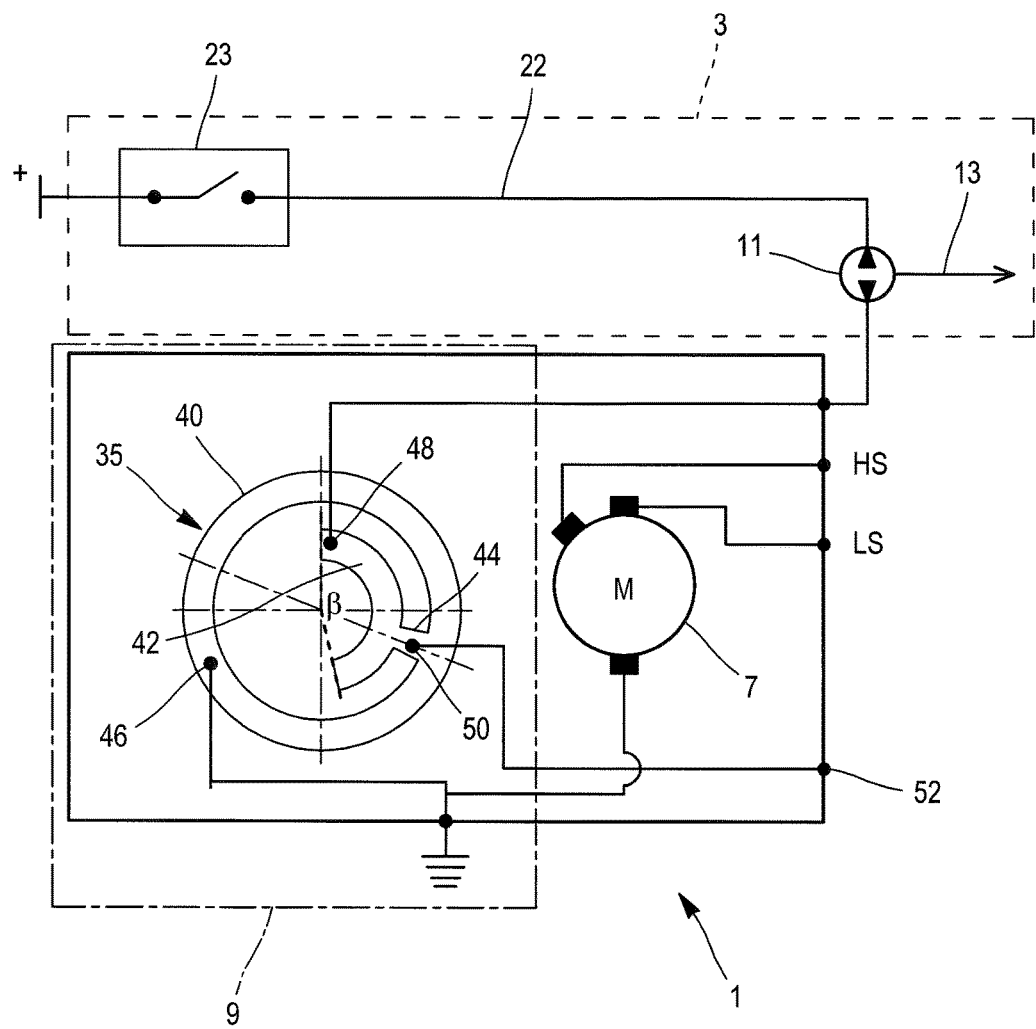

(51) Int. Cl.
*B60S 1/08* (2006.01)
*H02K 11/21* (2016.01)

(58) Field of Classification Search
USPC .......................... 15/250.02, 250.12, 250.17
See application file for complete search history.

(56) References Cited

U.S. PATENT DOCUMENTS

| | | | |
|---|---|---|---|
| 4,285,089 A | | 8/1981 | Takahashi et al. |
| 4,336,482 A | * | 6/1982 | Goertler ............... B60S 1/0814 |
| | | | 15/250.12 |
| 4,823,058 A | * | 4/1989 | Buchanan, Jr. ....... B60S 1/0807 |
| | | | 15/250.17 |
| 5,285,138 A | * | 2/1994 | Okada ................... B60S 1/0807 |
| | | | 15/250.12 |
| 5,339,490 A | * | 8/1994 | Charng .................... B60S 1/38 |
| | | | 15/250.31 |
| 2004/0177465 A1 | * | 9/2004 | Steffee ................. B60S 1/3801 |
| | | | 15/250.41 |

FOREIGN PATENT DOCUMENTS

| | | |
|---|---|---|
| FR | 2927295 A1 | 8/2009 |
| GB | 1236398 A | 6/1971 |

\* cited by examiner

WIPER SYSTEM FOR A VEHICLE WITH A SCREEN WASH SYSTEM

The present invention relates to a wiper system for a glazed surface of a motor vehicle, such as the windscreen and/or the rear window, with a screen wash system.

In existing screen wash systems, it is known for the screen wash to be distributed over only a portion of the upward or downward path of the blade on the glazed surface.

Thus, screen wash systems enabling the spray to be controlled when the wiper arm or arms are in predetermined angular zones have already been developed.

Document GB 1 236 398 describes a screen wash system in which, when actuated, a pump continuously delivers screen wash from a tank through a fluid circuit to one or more nozzles. A solenoid valve is arranged in the fluid circuit to direct the screen wash either to the nozzles, or to the tank via a return pipe. Thus, depending on the position of the solenoid valve, the jets of screen wash projected by the nozzles are interrupted intermittently. The position of the solenoid valve is controlled by a mechanical sensor that cooperates with the edge of a mechanical cam arranged in rotation on a shaft of the wiper drive motor.

The wiper drive motor can be controlled by conductive tracks arranged on the cam and forming rotary switches with electrical contacts.

The solution described in this document is complex and requires many different parts.

Furthermore, the solenoid valve connected to the fluid circuit of the screen wash system has to be arranged close to the drive motor, which may cause operating problems if for example there are leakage problems around the solenoid valve.

Furthermore, this solution is electrically energy intensive because the pump operates continuously and the solenoid valve has to be switched constantly.

Document FR 2 766 144 describes a motor vehicle window cleaning system comprising means for projecting screen wash onto same with at least two nozzles and means for wiping the window using a determined wiping cycle.

This system also includes means for controlling operation of the means for projecting liquid onto the window using information on the position of the wiping means in the wiping cycle, provided by corresponding detection means, to ensure that liquid is only projected in front of the wiping means, in the wiping direction of same.

The means for detecting the position of the wiping means for example are formed by a position sensor built directly into the wiping-means activation motor.

Such detection means may for example include a sliding-contact switch and a contact track forming a switch-like member for controlling the power supply of a solenoid valve, for example, placed between the output of the screen wash pump and the nozzles.

In the prior-art example, the screen wash is always projected in front of each blade, but the pump still operates continuously such that a significant quantity of screen wash is used for each cycle. Furthermore, the use of this solenoid valve is also a significant cost factor, making this solution very expensive. This solution also has the same drawbacks as document GB 1 236 398.

Document U.S. Pat. No. 4,275,477 describes a screen wash system able to cooperate with the wiping system of a vehicle windscreen. The screen wash system is structurally independent of the wiping system, notably in that the nozzles are attached in relation to the bonnet of the vehicle. Nonetheless, the two systems cooperate closely on account of the fact that some of the screen wash kept in the cleaning tank is drawn off by a pump using information and electrical commands given by a cam located on the drive motor of the wiper arm. More specifically, in this system, no liquid is sprayed when the arm approaches the jet from the nozzle.

Unlike the two other documents in the prior-art documents cited above, power supply of the screen-wash pump is controlled using conductive tracks on the cam and numerous sliding contacts cooperating with these tracks.

However, the contacts intended to come into contact with the conductive tracks are linked to a positive pole of the battery, which is not ideal in terms of electrical safety.

Furthermore, the cam has several separate conductive segments and tracks, making the cam in document U.S. Pat. No. 4,285,089 costly and complex to assemble.

The high number of sliding contacts is also a potential source of faults.

The present invention is intended to propose a wiper system with a simplified cam and fewer sliding contacts.

For this purpose, the invention relates to a drive motor for at least one wiper arm intended to wipe a glazed surface of a motor vehicle, the motor including a cam surface linked in concentric rotation with a rotary shaft of the drive motor, and static cam reading means able to cooperate with said cam according to the angular positions occupied by said cam to generate electrical control signals varying as a function of the angular position of the wiper arm on the glazed surface, the cam having a first circular conductive track, a second semi-circular conductive track concentric to the first conductive track and connected to same via a conductive bridge, in which the static reading means are formed by three sliding contacts able to make and break electrical contact with respectively the first and second conductive tracks and the conductive bridge depending on the angular positions occupied by said cam.

The invention also relates to a wiper system for a glazed surface of a motor vehicle having a screen wash system that can be used in combination with a tank containing screen wash, said wiper system including a drive motor according to the invention, and the screen wash system including a pump designed to be connected fluidly firstly to said tank and secondly to at least one nozzle able to deliver a jet of liquid onto the glazed surface of the vehicle.

Thus, the cam with the conductive track is simplified and can be produced more cheaply.

Furthermore, the same set of conductive tracks is used to control the drive motor and to power the pump.

In addition, as the conductive bridge is concentrically positioned between the first circular conductive track and the second semi-circular conductive track reinforces the mechanical strength and avoids any deformation of the conductive bridge, the conductive bridge is thus not cantilever. Indeed, the contact surface of the conductive bridge being smaller than the contact surface of the first and second conductive track, the conductive bridge is subjected to more severe mechanical stress on contact with its sliding contact.

The wiper system may also have one or more of the following features, taken individually or in combination.

According to one aspect, the first and second conductive tracks and the conductive bridge are made from a single part.

According to another aspect, the first conductive track is grounded via the related sliding contact.

The sliding contact related to the second conductive track is for example linked to a pump.

The sliding contact related to the conductive bridge is for example linked to a control terminal of the drive motor to indicate the stopped position.

According to another aspect, the second conductive track and the conductive bridge are located inside the first conductive track.

According to another aspect, the length of the second conductive track corresponds to an angle defining the spray function of a screen wash system.

The spray function may be defined to spray when the wiper blades are moving upwards.

The first and second conductive tracks and the conductive bridge are for example made of brass.

Furthermore, the conductive bridge is oriented radially in relation to the axis of rotation of the cam.

Other advantages and features are included in the description of the invention, and in the attached drawings in which:

FIG. 1 is a schematic representation of a wiper system according to the invention in a first angular position of a drive motor of a wiper arm, FIGS. 2 to 6 are schematic representations of the wiper system in FIG. 1 in other angular positions of the drive motor of the wiper arm.

In these figures, identical elements bear the same reference numbers.

An example of a first embodiment of a wiper system 1 for a glazed surface of a motor vehicle is described below with reference to FIG. 1.

This system 1 includes a screen wash system 3 that can be used in combination with a tank (not shown) containing screen wash.

The wiper system 1 includes a drive motor 7 for at least one wiper arm (not shown), in particular a wiper arm positioned on the windscreen. The drive motor includes for example a terminal linked to a high-speed (HS) terminal to deliver current for high-speed wiping, a terminal linked to a low-speed (LS) terminal to deliver a current for low-speed wiping, and a terminal connected to ground.

The system 1 also includes means 9 for generating electrical control signals linked to the drive motor 7 that are able to generate electrical control signals that vary as a function of the angular position of the wiper arm on the glazed surface, i.e. the windscreen in this case.

This screen wash system 3 includes a pump 11, preferably unidirectional, that is linked fluidly firstly to said tank and secondly respectively via at least one delivery pipe 13 to at least one nozzle (not shown). The delivery pipe 13 is for example linked to a nozzle that is able to deliver a jet of liquid onto the windscreen of a vehicle.

The screen wash system 3 also includes a first electrical line 22 linked to an input terminal of the pump 11. This electrical line may be connected via a controller 23 on the steering wheel of the vehicle for example in the form of a switch or via a built-in systems interface" (BSI) to a positive pole of the battery.

The other input terminal of the pump 11 is connected to means 9 for generating electrical control signals.

The generation means 9 include a surface 35 forming a cam arranged on a wheel linked in concentric rotation to the shaft of the drive motor 7 and static reading means.

The cam 35 has a first circular conductive track 40, a second semi-circular conductive track 42 that is concentric to the first conductive track 40 and linked to same by a conductive bridge 44 positioned between the two conductive tracks 40 and 42.

The static reading means are three sliding contacts 46, 48, 50 able to make and break electrical contact with respectively the first 40 and second 42 conductive tracks and the conductive bridge 44 depending on the angular positions occupied by said cam 35. The conductive bridge 44 is oriented radially in relation to the axis of rotation of the cam 35.

Advantageously, the first and second conductive tracks 40, 42 and the conductive bridge 44 are made from a single part, for example from a conductive material such as brass, which facilitates assembly with the wheel, which is for example made of plastic, thereby reducing assembly time.

According to the example in the figures, the first conductive track 40 is arranged outside the second conductive track 42 and the conductive bridge 44.

The first conductive track 40 is linked to ground via the related sliding contact 46, the sliding contact 48 related to the second conductive track 42 is linked to the pump 11 and the sliding contact 50 related to the conductive bridge 44 is linked to a control terminal 52 of the drive motor 50 to indicate the stopped position.

The length of the second conductive track 42 corresponds to an angle β defining the spray function of the screen wash system 3, in particular to spray when the wiper blades are moving upwards. The semicircle extends around an angle β defining the surface to be wiped on the windscreen of the vehicle. This surface represents the distance travelled by the wiper blade in an upward-movement phase or a downward-movement phase. The semicircle extends notably through an angle β of less than 180°. Preferably and after a series of tests, it has been determined that washing is optimum when the semicircle extends notably through an angle β of between 80° and 130°.

The wiper system 1 works as follows:

In general, the sliding contact 46 is always in contact with the conductive track 40, regardless of the position of the drive motor 7, and it links this track 40 to ground.

All of the tracks are therefore always linked to ground, which increases the operating safety of the system 1.

in FIG. 1, the system 1 is in parked position (or stopped position). In this case, the sliding contact 50 is in contact with the conductive bridge 44 and the sliding contact 48 is in contact with the semi-circular conductive track 42. In this position, the line 22 is not linked to a positive terminal and therefore the pump 11 is not powered.

If the driver then activates, for example from the steering wheel of the vehicle, a wash cycle (closing the switch 23), in this case the line 22 is connected to a positive voltage terminal and, on account of the fact that the sliding contact 50 is linked via the conductive track 42, the conductive bridge 44, the conductive track 40 and the sliding contact 46 to ground, the pump 11 starts to operate and a jet of screen wash is projected onto the glazed surface of the vehicle.

Figure 2:
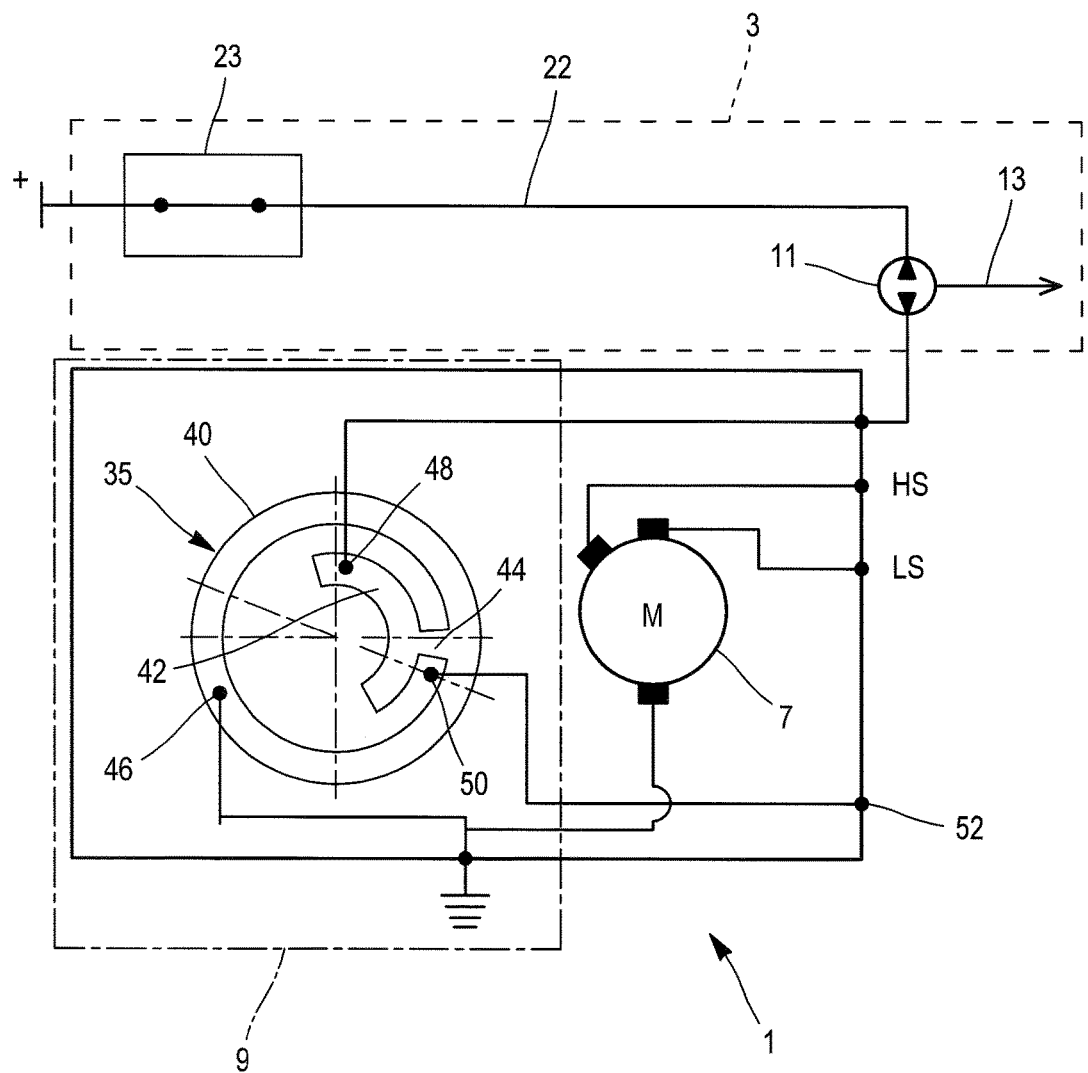

Simultaneously, the drive motor 7 begins to operate and moves away from the parked position of same, which results in the sliding contact 50 no longer being in contact with the conductive bridge 44 (see FIG. 2). In the figures, the drive motor 7 rotates anticlockwise.

Figure 3:
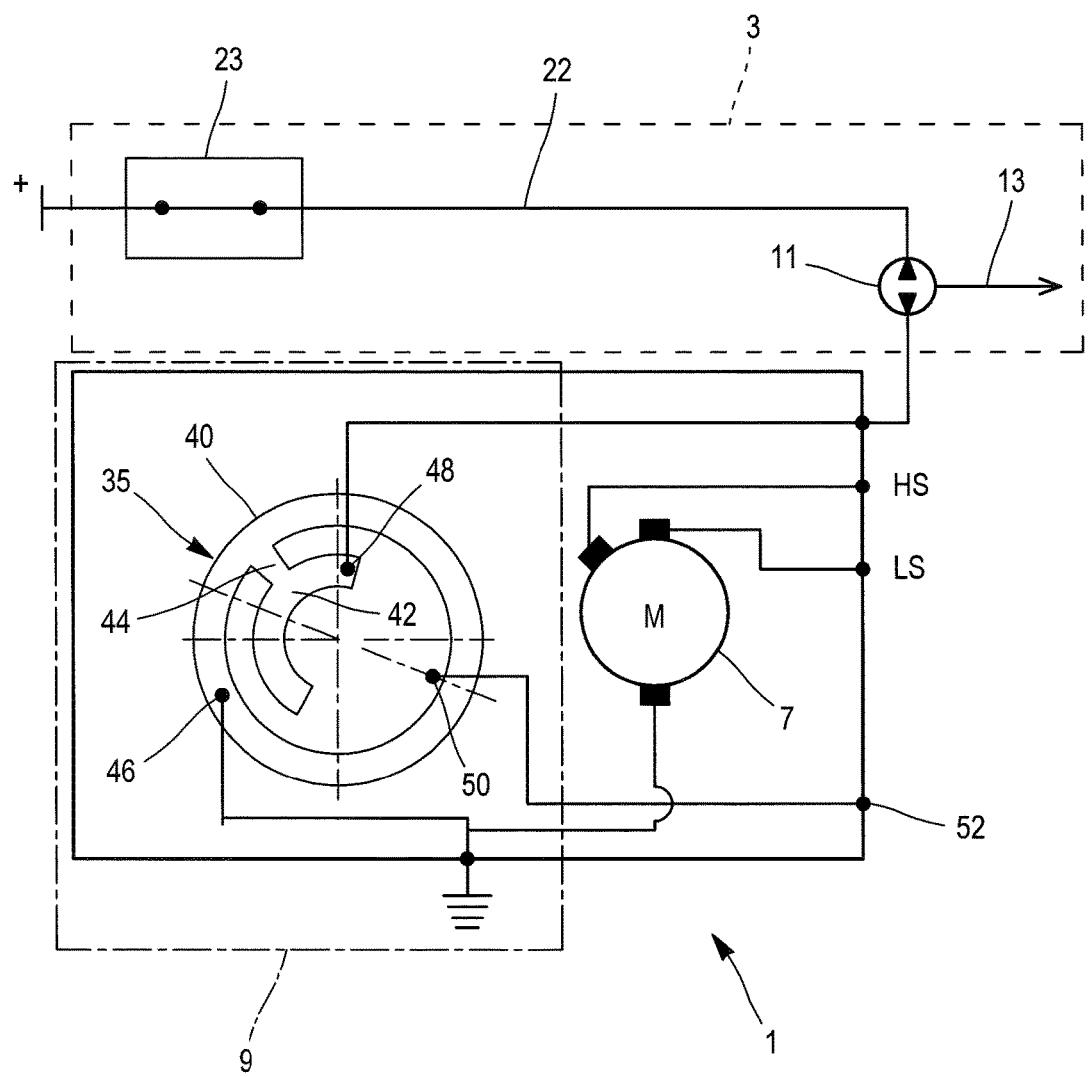
Figure 4:
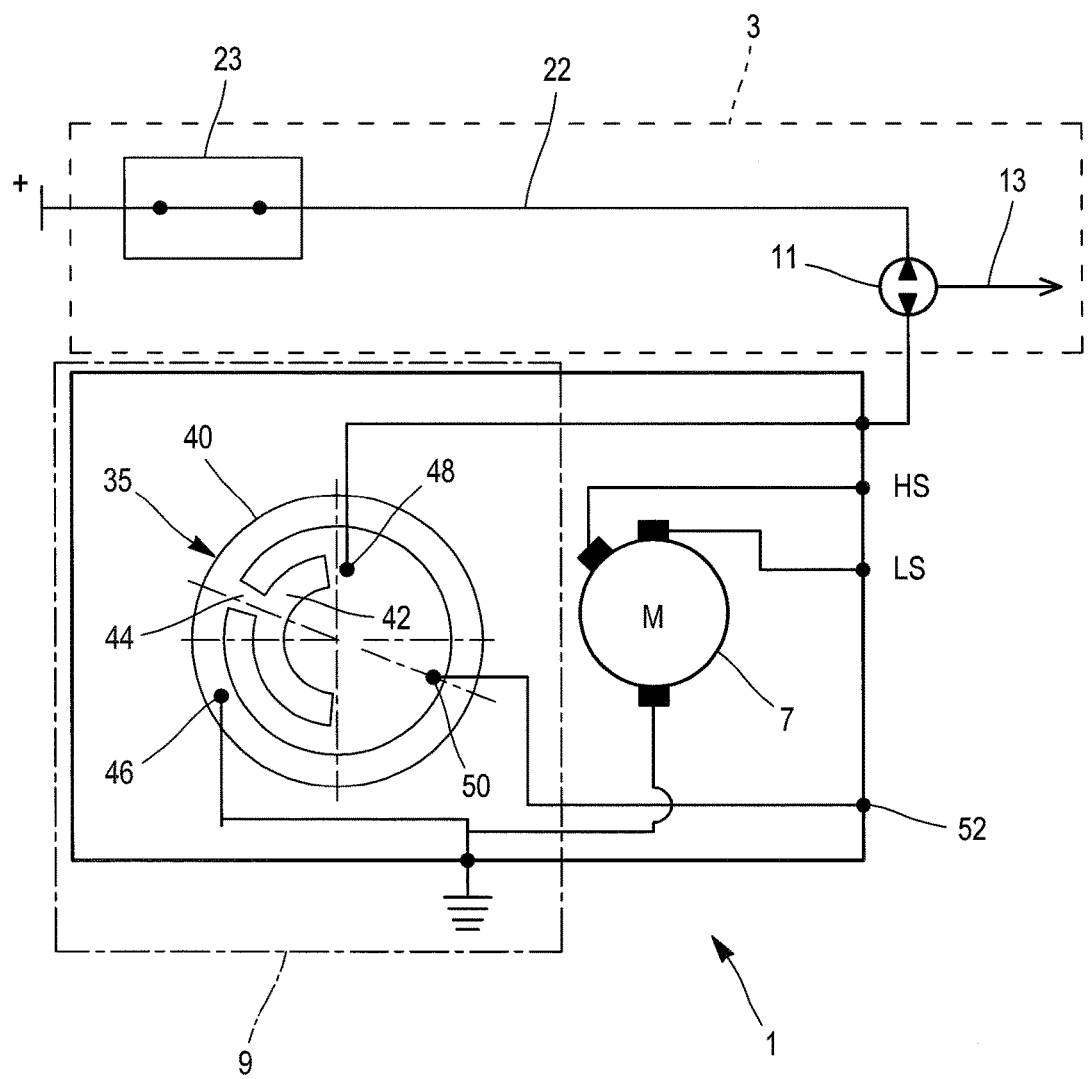

The pump 11 operates as long as the sliding contact 48 is in contact with the second semi-circular conductive track 42, when the wiper blades are moving upwards (see also FIG. 3).

Figure 5:
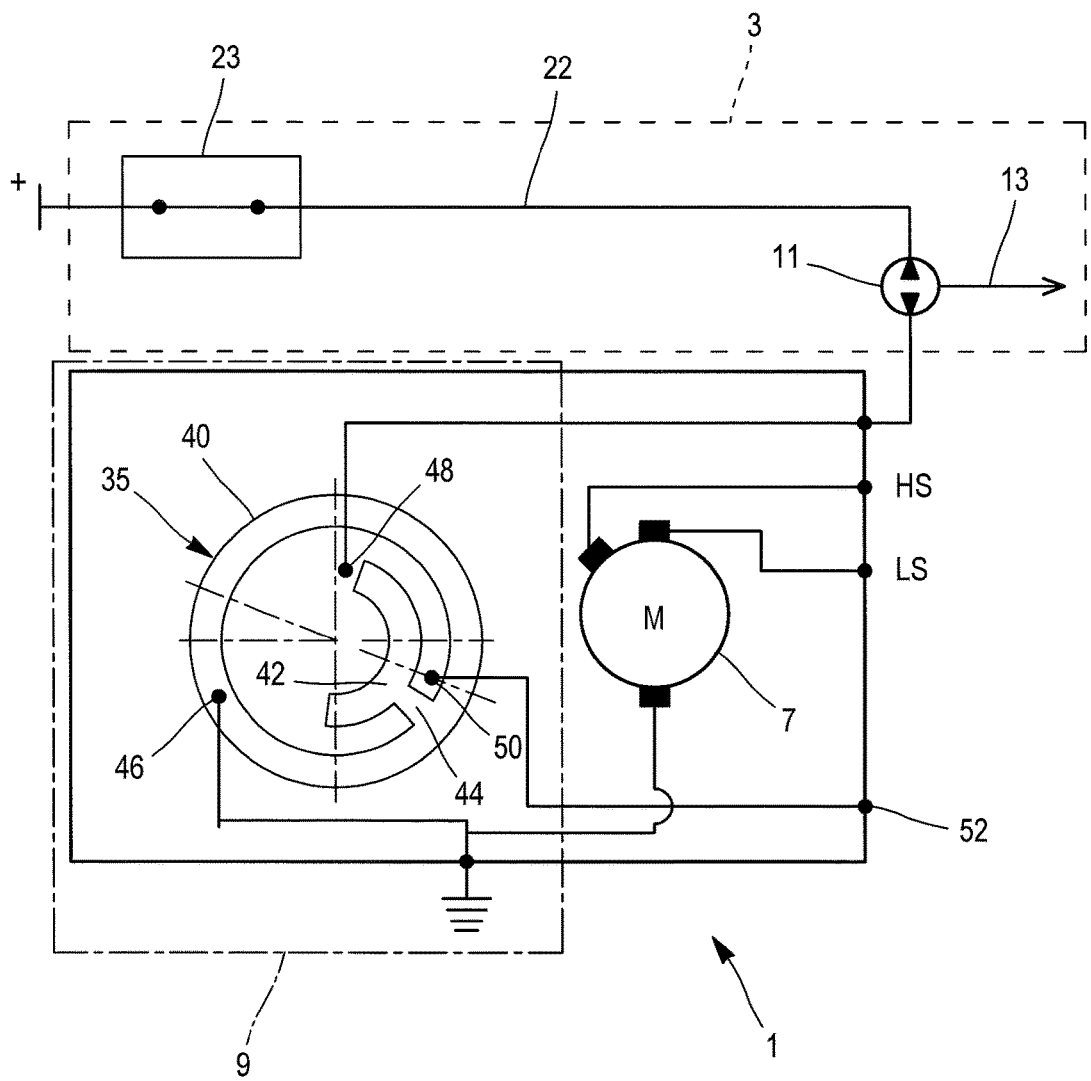

When the sliding contact 48 is no longer in contact with the second conductive track 44 and is sliding, like the sliding contact 50, on the isolating plastic portion of the wheel, the pump 11 stops and the projection of the jet of screen wash is interrupted (see FIG. 5). This corresponds to the time during which the wiper blades are moving downwards. This improves driver visibility during wiping.

Figure 6:
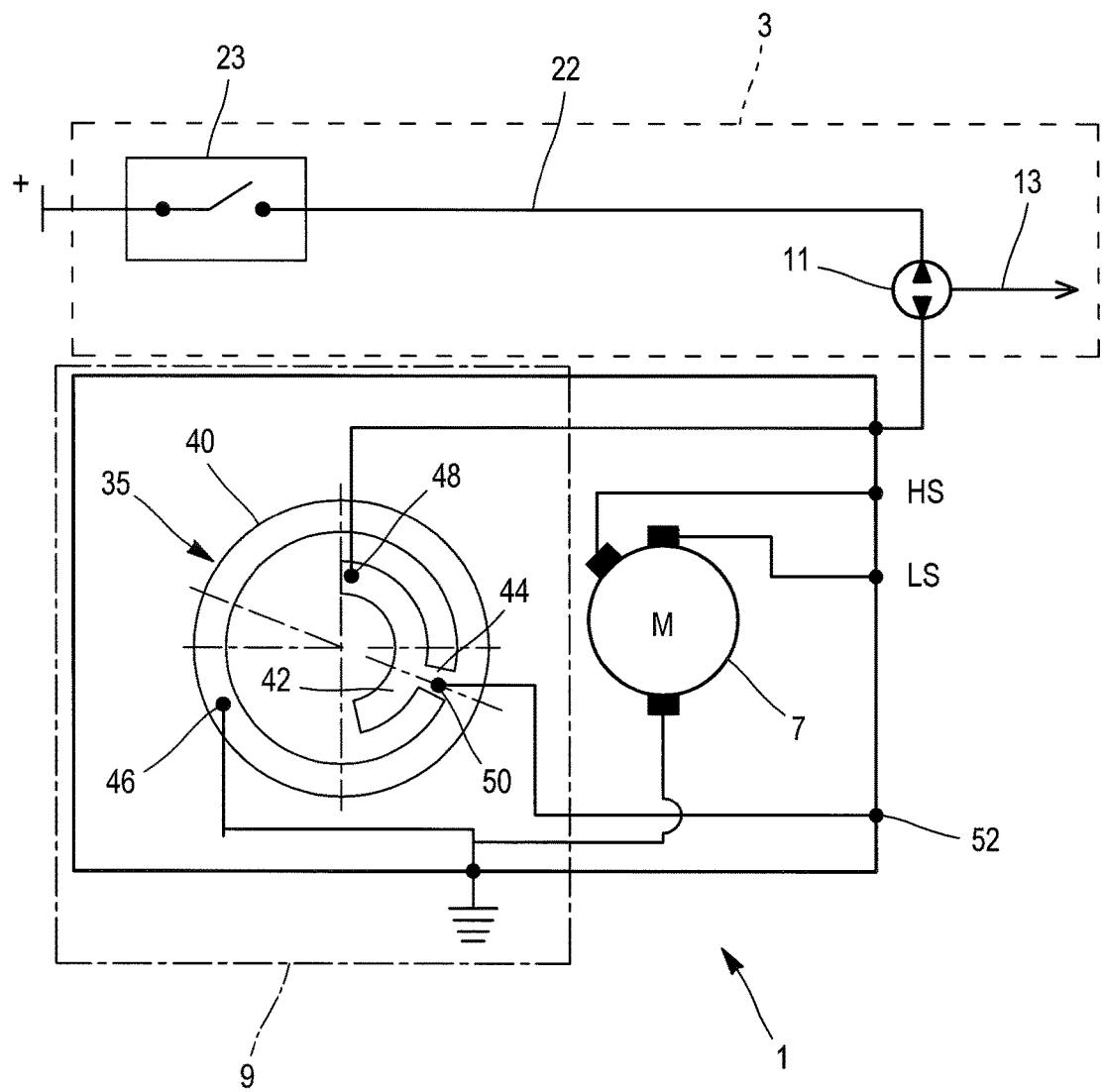

With reference to FIG. 6, the drive motor 7 with the cam 35 returns to the parked position, which stops the drive motor and cuts off power to the pump 11.

As such, the wiper system 1 makes it possible to cheaply perform a wash function synchronized with the movement of the wiper blades using a limited number of components (only three sliding contacts 46, 48 and 50 and one cam bearing a set of conductive tracks made from a single part).

The invention claimed is:

1. An assembly for at least one wiper arm intended to wipe a glazed surface of a motor vehicle, the assembly comprising:
   a drive motor to drive the at least one wiper arm; and
   a means for generating electrical control signals that comprises:
      a cam surface linked in concentric rotation with a rotary shaft of the drive motor; and
      static cam reading means able to cooperate with said cam according to angular positions occupied by said cam to generate electrical control signals varying as a function of the angular position of the at least one wiper arm on the glazed surface,
      wherein the cam has a first circular conductive track comprising a closed circumference that intersects the entirety of a circumference of a circle, a second semi-circular conductive track that is concentric to the first conductive track and connected to the first conductive track via a conductive bridge and the second conductive track reinforces the mechanical strength of the conductive bridge,
      wherein the static reading means are formed by a first, second, and third sliding contacts able to make and break an electrical contact with respectively the first and second conductive tracks and the conductive bridge depending on the angular positions occupied by said cam,
      wherein the third sliding contact that is related to the conductive bridge is linked to a control terminal of the drive motor to indicate a stopped position, and
      wherein only the electrical contact made by the third sliding contact with the conductive bridge is indicative of the stopped position.

2. The assembly according to claim 1, wherein the first and second conductive tracks and the conductive bridge are made from a single part.

3. The assembly according to claim 1, wherein the first conductive track is linked to ground via the first sliding contact.

4. The assembly according to claim 1, wherein the second sliding contact links the second conductive track to a pump.

5. The assembly according to claim 1, wherein the second conductive track and the conductive bridge are located inside the first conductive track.

6. The assembly according to claim 1, wherein the length of the second conductive track corresponds to an angle defining the spray function of a screen wash system.

7. The assembly according to claim 6, wherein the spray function is defined to spray when the at least one wiper arm is moving upwards.

8. The assembly according to claim 1, wherein the first and second conductive tracks and the conductive bridge are made of a conductive material such as brass.

9. The assembly according to claim 1, wherein the conductive bridge is oriented radially in relation to the axis of rotation of the cam.

10. A wiper system for a glazed surface of a motor vehicle having a screen wash system that can be used in combination with a tank containing screen wash, said wiper system comprising:
    the assembly according to claim 1; and
    the screen wash system comprising a pump intended to be linked fluidly firstly to said tank and secondly to at least one nozzle able to deliver a jet of liquid onto the glazed surface of the vehicle.

11. An assembly for at least one wiper arm intended to wipe a glazed surface of a motor vehicle, the assembly comprising:
    a drive motor to drive the at least one wiper arm; and
    a means for generating electrical control signals that comprises:
       a cam surface linked in concentric rotation with a rotary shaft of the drive motor; and
       static cam reading means able to cooperate with said cam according to angular positions occupied by said cam to generate electrical control signals varying as a function of the angular position of the at least one wiper arm on the glazed surface,
       wherein the cam has a first circular conductive track comprising a closed circumference that intersects the entirety of a circumference of a circle, a second semi-circular conductive track that is concentric to the first conductive track and connected to the first conductive track via a conductive bridge and the second conductive track reinforces the mechanical strength of the conductive bridge,
       wherein the static reading means are formed by a first, second, and third sliding contacts able to make and break an electrical contact with respectively the first and second conductive tracks and the conductive bridge depending on the angular positions occupied by said cam,
       wherein the third sliding contact that is related to the conductive bridge is linked to a control terminal of the drive motor to indicate a stopped position, and
       wherein the length of the second conductive track corresponds to an angle defining the spray function of a screen wash system wherein the spray function is defined to spray when the at least one wiper arm is moving upwards.

* * * * *